(12) United States Patent
Schladt et al.

(10) Patent No.: US 10,790,515 B2
(45) Date of Patent: Sep. 29, 2020

(54) SUPPORTED CATALYST MATERIAL FOR A FUEL CELL

(71) Applicants: VOLKSWAGEN AG, Wolfsburg (DE); AUDI AG, Ingolstadt (DE)

(72) Inventors: Thomas Schladt, Braunschweig (DE); Tanja Graf, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 148 days.

(21) Appl. No.: 15/456,389

(22) Filed: Mar. 10, 2017

(65) Prior Publication Data

US 2017/0263944 A1   Sep. 14, 2017

(30) Foreign Application Priority Data

Mar. 10, 2016   (DE) .................. 10 2016 203 936

(51) Int. Cl.
*H01M 4/92* (2006.01)
*H01M 4/86* (2006.01)
*H01M 4/90* (2006.01)

(52) U.S. Cl.
CPC ......... *H01M 4/926* (2013.01); *H01M 4/8605* (2013.01); *H01M 4/8668* (2013.01); *H01M 4/9058* (2013.01); *H01M 4/9083* (2013.01)

(58) Field of Classification Search
CPC .. H01M 4/9058; H01M 4/9083; H01M 4/826; H01M 4/926
See application file for complete search history.

(56) References Cited

U.S. PATENT DOCUMENTS

| | | | |
|---|---|---|---|
| 4,080,276 A * | 3/1978 | Bode .................. | G01N 27/4075 204/429 |
| 6,040,077 A | 3/2000 | Debe et al. | |
| 7,303,834 B2 | 12/2007 | Dearnaley et al. | |
| 8,283,275 B2 | 10/2012 | Heo et al. | |
| 2005/0014635 A1* | 1/2005 | Zhou ..................... | H01M 4/921 502/159 |
| 2006/0183633 A1 | 8/2006 | Iwasaki | |
| 2010/0092841 A1* | 4/2010 | Lopez .................. | B22F 1/0018 429/409 |
| 2010/0316930 A1* | 12/2010 | Shao ..................... | H01M 4/921 429/482 |

(Continued)

FOREIGN PATENT DOCUMENTS

| | | |
|---|---|---|
| CA | 2 924 326 A1 | 10/2015 |
| CN | 101301615 A | 11/2008 |

(Continued)

*Primary Examiner* — Ula C Ruddock
*Assistant Examiner* — Matthew W Van Oudenaren
(74) *Attorney, Agent, or Firm* — Seed Intellectual Property Law Group LLP (57) ABSTRACT

The disclosure relates to a supported catalyst material for a fuel cell. This comprises an electrically conductive, carbon-based carrier material and catalytic structures deposited or grown on the carrier material with a multilayer structure. The core layer comprises an electrically conductive bulk material, with the bulk material in direct contact with the carbon-based carrier material. The thin surface layer has a catalytically active noble metal or an alloy thereof. The preparation is carried out directly onto the carrier material with the deposition of the corresponding starting materials from the gas phase.

19 Claims, 4 Drawing Sheets

(56) References Cited

U.S. PATENT DOCUMENTS

| | | | |
|---|---|---|---|
| 2012/0058417 A1* | 3/2012 | Shao | H01M 4/9083 |
| | | | 429/524 |
| 2015/0147682 A1* | 5/2015 | Kuttiyiel | H01M 4/92 |
| | | | 429/524 |
| 2015/0171433 A1* | 6/2015 | Kongkanand | H01M 4/9075 |
| | | | 429/524 |
| 2016/0233516 A1* | 8/2016 | Nakamura | H01M 4/8657 |

FOREIGN PATENT DOCUMENTS

| | | |
|---|---|---|
| DE | 698 24 875 T2 | 7/2005 |
| DE | 10 2014 118 286 A1 | 6/2015 |
| JP | 2010-67509 A | 3/2010 |
| WO | WO2015147309 * | 3/2015 |

\* cited by examiner

SUPPORTED CATALYST MATERIAL FOR A FUEL CELL

BACKGROUND

Technical Field

The disclosure relates to a carbon-supported catalyst material for a fuel cell, as well as an electrode structure and a fuel cell with such a catalyst material. The disclosure further relates to a process for the preparation of the supported catalyst material.

Description of the Related Art

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (often proton-conducting) membrane and of a catalytic electrode (anode and cathode), respectively arranged on both sides of the membrane. The latter generally comprise supported precious metals, in particular platinum. In addition, gas diffusion layers (GDL) can be arranged on both sides of the membrane-electrode arrangement on the sides of the electrodes facing away from the membrane. Generally, the fuel cell is constituted by a plurality of MEAs arranged in the stack, whose electrical power outputs accumulates. Between the individual membrane electrode assemblies, bipolar plates (also called flow field plates or separator plates) are usually arranged, which ensure a supply of the individual cells with the operating media, i.e., the reactants, and are usually also used for cooling. In addition, the bipolar plates also ensure an electrically conductive contact to the membrane electrode assemblies.

During operation of the fuel cell, the fuel (anode operating medium), in particular hydrogen $H_2$ or a hydrogen-containing gas mixture, is fed to the anode via an anode-side open flux field of the bipolar plate where electrochemical oxidation of $H_2$ to protons $H^+$ takes place with release of electrons ($H_2 \rightarrow 2\ H^+ + 2e^-$). A (water-bound or water-free) transport of the protons from the anode space into the cathode space is effected via the electrolyte or the membrane, which separates the reaction spaces from each other gas-tight and electrically insulated. The electrons provided at the anode are guided to the cathode via an electrical line. The cathode is supplied with oxygen or an oxygen-containing gas mixture (for example air) as a cathode operating medium via a cathode-side open flux field of the bipolar plate, so that a reduction of $O_2$ to $O^{2-}$ takes place with the inclusion of the electrons ($\frac{1}{2}\ O_2 + 2e^- \rightarrow O^{2-}$). At the same time, the oxygen anions react with the protons transported across the membrane to form water ($O^{2-} + 2\ H^+ \rightarrow H_2O$) in the cathode space.

In the fuel cell, platinum is generally used as a catalyst for the fuel cell reaction. Since this is an electrochemical surface process, the largest possible catalytic surface (ECSA) is applied. For this purpose, platinum particles in the size range of a few nanometers are applied to a carbon carrier with a large surface area. In addition, the activity of the catalyst is increased by alloying other elements (especially cobalt and nickel) in order to ensure a higher fuel throughput and thus a high electrical power. In the course of fuel cell operation; however, some of the electrical power is lost by electrode degradation. The main reason for this is the loss of ECSA and activity due to (unfavorable) operating conditions. The underlying mechanisms include the dissolution of the platinum (platinum corrosion), the corrosion of the alloy elements cobalt or nickel, the growth of the platinum nanoparticles by Ostwald maturation, the growth of the platinum nanoparticles by migration and sintering on the carbon surface, detachment of the platinum particles from the carbon carrier.

In order to counteract the loss of catalytic activity and thus to ensure the performance requirements over the operating time of the fuel cell, an additional amount of the noble metal is usually used in the manufacture of the electrodes. However, this measure is quite cost-intensive. In order to achieve a sustained reduction in the amount of platinum in the fuel cell, of the corrosion stability of the platinum or platinum alloy particles on the one hand and, on the other hand, their adhesion on the carbon surface must be improved.

It is known in this context to reduce the absolute amount of noble metal by admixing further elements into the noble metal alloy. As a positive additive, such alloying catalysts even have a higher initial activity (begin-of-life or BOL activity) than pure platinum. However, due to the non-noble character of these elements compared to platinum, such catalysts are much more susceptible to corrosion and therefore have to be subjected to special pretreatments. The most common method is the (electro) chemical de-alloying, in which the base alloy components are dissolved out of the catalyst surface, so that a protective coating of platinum remains on the alloy. However, alloy catalysts do not solve the fundamental problems of long-term stability, but even exacerbate them. Precious metal alloys are not long-term stable, i.e., the alloying components are lost over time. The process of chemical segregation only delays this process. The reason for this is the diffusion capacity of the less noble alloying constituents to the surface, that is, by the concentration gradient from the particle interior to the outside, the less noble metal atoms are diffused to the surface and are ultimately detached. The basic problem of platinum corrosion continues to exist. Furthermore, the adhesion which is only based on physical bonding, between noble metal particles and carbon support surface is usually not sufficient.

In addition, research approaches are being pursued to produce nanoparticles with a core-shell structure. In this process, a very thin layer of the noble metal is produced on a more favorable core material and, thus, the amount of precious metal is significantly reduced. Frequently, the noble metal layer is produced by subjecting particles from a homogeneous noble metal alloy, as described above, to (electro) chemical demixing, with a layer of the noble metal which is; however, usually not continuous, being separated on the particle surface. However, methods are also known in which the deposition of thin noble metal layers onto a less expensive, more cost-effective volume material, for example, takes place from the gas phase or wet-chemically.

DE 698 24 875 T2 describes the production of non-conductive nanostructured carrier structures from an organic pigment on a carrier film. These carrier structures are coated by means of physical or chemical vapor deposition (PVD, CVD) in order to produce nanostructured catalyst elements, which are then transferred directly to the polymer electrolyte membrane of the fuel cell by a pressing process. The catalyst elements can thereby have different compositions on their surface and in their internal volume by sequential deposition of different materials.

US 2006/0183633 A1 describes a catalyst structure for the anode of a direct methanol fuel cell (DMFC). This comprises a carrier material of Al, Ti, TiN, W, Mo or Hf on which local elevations (nanodots) are deposited from a metal carbide, such as WC, MoC or TaC, and on these catalytic particles by means of physical or chemical vapor deposition. Both the bumps and the catalytic particles consist of a metal carbide, such as WC, MoC or TaC, and may optionally be provided with a carbon nanohorn (CNH) coating.

The catalytic particles are generally present on an electrically conductive carrier material of large specific surface area, which is often a particulate carbon-based material, for example carbon nanotubes (CNT) or the like. The deposition of the catalytic particles on the carrier material is usually carried out using wet-chemical methods using metal-organic precursor compounds of the catalytic metal (for example U.S. Pat. No. 8,283,275 B2). In addition, the deposition of catalytic noble metal particles onto the carbon carrier from the gas phase is also known (for example U.S. Pat. No. 7,303,834 B2). Subsequently, the catalyst thus supported is mixed with an ionomer and applied in the form of a paste or suspension as a coating to a carbon paper, directly onto the polymer electrolyte membrane or to the gas diffusion layer, and dried.

BRIEF SUMMARY

The object of the disclosure is to provide a catalyst material for a fuel cell which ensures a long service life and at the same time manages with a small amount of noble metal. Furthermore, a corresponding electrode structure, as well as a fuel cell with such an arrangement should be provided.

This object is achieved by a supported catalyst material, an electrode structure, a fuel cell and a method for producing the catalyst material with the features of the independent demands. Additional preferred embodiments of the disclosure arise from the other features stated in the sub-claims and the following description.

The supported catalyst material for a fuel cell according to the present disclosure comprises a porous, electrically conductive, carbon-based carrier material and catalytic structures deposited or grown on the carrier material. The catalytic structures have a multilayer structure which comprises from the inside to the outside at least:
- a core layer comprising an electrically conductive volume material, the volume material being in direct contact with the carbon-based carrier material, and
- a surface layer comprising a catalytically active noble metal or an alloy thereof.

Thus, when the volume material of the core layer is deposited or grown directly on the carbon-based carrier material, it has a material bond with the carrier material. Compared to a subsequent adsorption of spherical particles with a core-shell structure according to the prior art, the inventive catalyst material thus ensures a very stable and long-lasting adhesion to the carrier material. The volume material thus has, on the one hand, the task of ensuring a stable bonding of the noble metal to the carrier material and, on the other hand, a large surface for the catalytic noble metal, the inner volume of these surface-enlarging structures being represented by a comparatively inexpensive material.

Within the scope of the present disclosure, the term "catalytic structures" is understood to mean structures which are formed (grown, deposited) on the carbon-based carrier material and are arranged discretely, that is to say separately, on the carrier material. Thus, there may be gaps between adjacent catalytic structures in which the carrier material is exposed. The catalytic structures can have an arbitrary shape, for example approximately the shape of a ball segment, in particular a hemisphere. However, it is understood that the structures generally do not have the ideal shape of a spherical surface and are determined in particular by the crystal structure of the volume material. Irrespective of their geometric form, the catalytic structures have a type of core-shell structure, more precisely a "cut-open" core-shell structure, in which the "cutting surface" is arranged on the carrier material and in contact therewith.

As already mentioned, the main task of the volume material forming the core layer is to ensure a stable adhesion of the noble metal or its alloy to the carrier material and, at the same time, to replace the noble metal inside the catalytic structure with a comparatively inexpensive material. In order to allow the uptake or release of electrons during the catalytic fuel cell reactions taking place at the catalytically active noble metal, the volume material of the core layer should also have a good electrical conductivity. Furthermore, the volume material should have a high chemical, thermal and mechanical long-term stability and be as inexpensive as possible compared to the noble metal. In order to obtain a good bond to the carbon carrier, a suitable crystal lattice of the volume material is advantageous, that is to say a similar crystal structure and a lattice constant similar to that of the carbon material. Furthermore, in order to achieve a stable connection of the surface layer (or a possibly intervening layer), a high surface energy and a grid structure compatible with the surface layer is desirable, wherein it is preferred that the lattice constant of the volume material is at most that of the surface layer, especially platinum. By selecting a lattice of the volume material with a slightly lesser lattice constant, a contraction of the noble metal lattice and the resulting distorting effects of the crystal lattice, as well as by quantum mechanical interactions between the lattices, result in an increased activity, as well as a particularly dense ball packing of the noble metal. Overall, the adhesion is determined by the surface energy, a good concordance between the crystal lattices with respect to symmetry and lattice parameters, as well as the bonding states at the boundary surface (displacement of the d-band center). Suitable materials that meet these criteria include binary, ternary, quaternary or higher nitrides, carbides, borides, and oxides of metals, as well as combinations and mixtures thereof. Of these, nitrides and carbides are particularly preferred. Combinations of these are understood as mixed compounds, such as carbonitrides, oxynitrides, carboborides, etc. In addition, combinations also include compounds having two or more different metals. The volume material thus also comprises ternary ($M_m M'_{m'} Y_y$), quaternary ($M_m M'_{m'} Y_y Z_z$) and higher compositions, where M and M' are each a metal, Y and Z each N, C, B or O and m, m', y and z are obtained from the oxidation numbers of the components and their molar fractions (for ternary nitrides, for example, $M_{(1-m')} M'_{m'} N$). The corresponding metal in these compounds is selected in particular with regard to the lattice constant. An example of a volume material preferred in connection with platinum as a noble metal is titanium nitride TiN.

In embodiments of the disclosure, the volume material of the core layer is at least selectively bonded covalently or materially to the carbon-based carrier material. In this way, the catalytic structures are not only bound to the carbon of the carrier material by physical adhesion forces, but also by significantly more stable chemical interactions or bonds. This can be achieved, in particular, by the formation of anchors on the carrier material during the production of the catalyst material, which is explained in more detail below.

The volume material of the core layer fills the main volume of the catalytic structures. According to embodiments of the disclosure, the core layer has, at its thickest point, a layer thickness in the range from 2 to 100 nm, in particular from 3 to 80 nm, preferably from 4 to 50 nm and particularly preferably in the range from 5 to 20 nm.

On the other hand, the layer thickness of the surface layer of the catalytically active noble metal or its alloy is to be selected as thin as possible. In particular, the surface layer has a layer thickness of an average of 1 to 6 atomic layers, preferably of 1 to 4 atomic layers and particularly preferably of 1 to 2 atomic layers. Particularly suitable as a noble metal for the catalytic surface layer are metals of the platinum group comprising ruthenium Ru, rhodium Rh, palladium Pd, osmium Os, iridium Ir and platinum Pt or an alloy of these metals. In particular, the surface layer comprises platinum or a platinum alloy, preferably, essentially pure platinum.

According to one embodiment of the disclosure, an adhesion-promoting layer is arranged between the core layer and the surface layer. The material for the adhesion-promoting layer is selected in such a way that it has the highest possible surface energy and the highest possible compatibility with the catalytic layer. In this way, the adhesion of the catalytic surface layer is further increased. Suitable materials for the adhesion-promoting layer are, in particular, materials which are known from semiconductor technology, for example tungsten W. The adhesion-promoting layer has as low a layer thickness as possible, the layer thicknesses indicated for the surface layer also being applicable to the adhesion-promoting layer.

Furthermore, according to a preferred embodiment of the disclosure, an intermediate layer comprising a noble metal alloy is arranged between the core layer and the surface layer or between the adhesion-promoting layer and the surface layer. In particular, the noble metal alloy of the intermediate layer is an alloy of the noble metal which is provided in the surface layer. In case of platinum as the surface material, suitable precious metal alloys include, for example, platinum-nickel alloys and platinum-cobalt alloys. By adding additional metals to the noble metal, an increase in the catalytic activity is achieved. The alloying elements should be chosen in such a way that they form a particularly strong bond with the noble metal, i.e., have a high thermodynamic stability so that the diffusion capacity of the alloying element atoms is reduced and thus the corrosion is kinetically inhibited.

The thickness of the intermediate layer is advantageously in the range from 2 to 20 atomic layers, in particular 3 to 10 atomic layers, particularly preferably 4 to 6 atomic layers.

According to one embodiment of the disclosure, crystal edges and/or crystal corners of the surface layer are covered by a local protective layer. Preferably, at least the surface layer of the catalytic structures, in particular also the underlying layers, is preferably semi-crystalline or crystalline. As is known, the corrosion of the catalytic noble metal of the surface layer begins at the crystal edges. The local protective layer can protect them against corrosive attack. Since the crystal edges, due to their high reactivity, do not release the products of the catalytic reaction, or only diminish them, and thus are not effectively involved in the catalytic reaction, the blocking of the crystal edges and corners does not lead to any or a negligible impairment of the catalytic activity. On the other hand, the high reactivity of the crystal edges and corners allows the selective application of the protective layer at these locations without covering the catalyst over a large area. Materials which are suitable as a protective layer for the edges and corners should have a high corrosion resistance. Suitable examples of materials of the protective layer include oxides, for example alumina $Al_2O_3$, boron oxide $B_2O_3$, silicon oxide $SiO_2$; Carbides, for example, boron carbide $B_4C$, silicon carbide SiC, wolfram carbide WC; Nitrides, for example, boron nitride BN, aluminum nitride AlN, silicon nitride $Si_3N_4$, titanium nitride TiN; and gold. However, the materials need not be a good electrical conductor.

The carbon-based carrier material is predominantly designed to provide a large specific surface area for the applied catalytic structures and also to establish the electrical connection between the catalytic centers of the material and the external circuit of the fuel cell. Preferably, the carbon-based carrier material has a porous, particulate, i.e., loose fill structure. This includes in particular spheroidal forms or fibers. Suitable materials include, in particular, carbon nanostructures, for example carbon nanotubes, carbon nanorods, carbon nanofibers, carbon nanobands; As well as graphite, volcano, graphitized carbon, graphene, ketjen black, acetylene black, furnace black, carbon black, activated carbon and meso phase carbon.

A further aspect of the present disclosure relates to an electrode structure for a fuel cell comprising a flat carrier and a catalytic coating, arranged on at least one of the two flat sides of the carrier which comprises the supported catalyst material according to the present disclosure. Thereby, the flat support is, for example, a polymer electrolyte membrane for a fuel cell. In this case, it is also referred to as a catalytically coated membrane (CCM). Alternatively, the flat carrier can be a gas-permeable electrically conductive substrate, for example a gas diffusion layer (GDL) or a further carrier layer of the fuel cell, for example carbon paper or the like. In the case of a catalytically coated gas diffusion layer, it is also referred to as a gas diffusion electrode.

The electrode structure can be produced by laminating the catalyst material directly onto the flat support. For this purpose, a suspension or paste is prepared comprising the catalyst material, a solvent and, if desired, further additives, such as binders or the like, and applied by any method to the flat support and dried.

A further aspect of the present disclosure relates to a fuel cell with a polymer electrolyte membrane and in each case a layer arranged on flat sides thereof, at least one of which comprises the supported catalyst material of the disclosure.

A further aspect of the disclosure relates to a process for the preparation of the catalyst material according to the disclosure. The method comprises the steps of:
  providing a carbon-based carrier material,
  generating an anchoring on the carrier material selected from a doping with a foreign material, a functional group, an electric charge, a free electron pair, and a crystal lattice error,
  depositing an electrically conductive volume material from the gas phase on and around the anchors and directly on the carbon-based carrier material to form core layers and
  depositing a layer comprising a catalytically active noble metal or an alloy thereof onto the core layers Thus, by generating the anchors on the carrier material, "nuclei" are formed thereon which serve as a starting point for the deposition of the volume material. In this way, the local generation of catalytic structures on the carrier material occurs, which can in particular be discrete, that is to say interrupted (instead of continuous layers). In this case, these anchoring points serve not only as nuclei for the growth of the catalytic structures, but also for the spatial separation (dispersion) of the structures.

Preferably, the anchors are dopants of the carbon of the carrier material with a foreign material, the doping material. In this case, either individual carbon atoms of the carbon lattice are replaced by the doping material or atoms of the doping material are deposited at interstitial positions in the manner of an intercalation compound. For example, hydrogen, oxygen, nitrogen, aluminum or boron is suitable as a doping material to provide such anchoring on the carbon surface. These can be produced by treatment with suitable chemical reagents or a suitable plasma treatment. Some of these methods are also suitable for covalently linking functional chemical groups on the carbon surface. For example, an oxygen doping or a functional oxygen group, for example, a carboxyl or carbonyl function, can be produced by the action of an oxidizing acid, such as sulfuric acid and/or nitric acid or by means of a treatment by oxygen plasma or a combination thereof. For the functionalization with nitrogen, the use of reactive gases, such as ammonia, hydrazine and the like, and/or nitrogen precursor compounds such as aniline or treatment with a nitrogen plasma is suitable. Nitrogen-containing functional groups such as, for example, amine, imine, amide groups and the like can also be formed. The introduction of a boron doping or a functional boron group can be carried out with the aid of inorganic or organic boron compounds. If the anchor point is of the type which forms a chemical reaction with the subsequently deposited volume material, the covalent bonding of the volume material occurs.

All of the subsequent layers of the catalytic structures (see above) can and are preferably applied to the carrier material by means of a gas-phase deposition. Compared to conventional wet-chemical processes, gas phase deposition methods allow precise control of the material composition, layer thickness and crystallinity of the produced layers. Owing to the large surface area and porosity of the carbon support, chemical vapor deposition methods such as CVD (chemical vapor deposition) or ALD (atomic laser deposition), physical vapor deposition (PVD), laser deposition (PLD) processes and others occur.

The various embodiments of the disclosure, as mentioned in this application, may be combined advantageously with one another, if not stated otherwise in individual cases.

BRIEF DESCRIPTION OF THE SEVERAL VIEWS OF THE DRAWINGS

The disclosure is in the following explained in embodiment examples on the basis of the respective drawings. They show.

DETAILED DESCRIPTION

FIG. 1 shows in a highly schematic manner the method according to the disclosure for producing a catalyst material for a fuel cell by means of various intermediates.

Figure 1A:
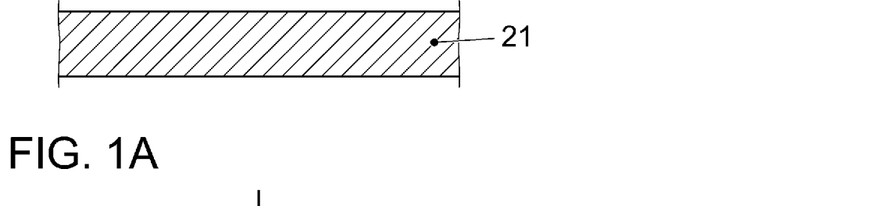
FIGS. 1A-1G shows process steps for producing a supported catalyst material according to one embodiment of the present disclosure.

The method begins with the provision of a carbon-based carrier material 21 according to FIG. 1A. Here, only a surface cut-out of the particulate material 21 is shown. For example, the carrier material can comprise a carbon nanostructures, for example carbon nanotubes, carbon nanorods, carbon nanofibers, carbon nanobands; as well as graphite, volcano, graphitized carbon, graphene, ketjen black, acetylene black, furnace black, carbon black, activated carbon and meso phase carbon.

Figure 1B:
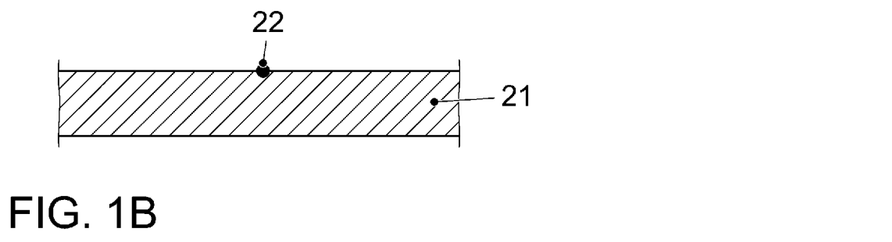

The carbon-based carrier material 21 is subjected to a surface treatment according to FIG. 1B in order to produce local anchors 22 on the carbon surface, which in the subsequent step serve as a docking point for the volume material. The anchor 22 is preferably a doping of the carbon, with a foreign material, which is introduced as an extraneous atom into the crystal lattice of the carbon material instead of a carbon atom or as intercalation in intermediate lattice positions. Preference is given to doping with hydrogen, oxygen, nitrogen and/or boron. In order to introduce these foreign atoms, treatment of the carbon carrier material 21 is carried out by means of a suitable reactant or a suitable process. In the case of oxygen functionality, treatment with an oxidizing acid, such as sulfuric acid and/or nitric acid of high concentration, can be carried out, as well as supplementary or alternatively a treatment by means of oxygen plasma. The functionalization with nitrogen can be effected by means of a precursor compound such as aniline or with reactive gases, such as ammonia, hydrazine or the like. A functionalization with boron is possible with the aid of inorganic or organic boron compounds. Subsequent to this pretreatment, tempering can be carried out in order to assist the diffusion of the doping element into the graphite structure or into the carbon lattice or the formation of functional groups such as carboxyl, carbonyl, amine, imine or amide groups.

Figure 1C:
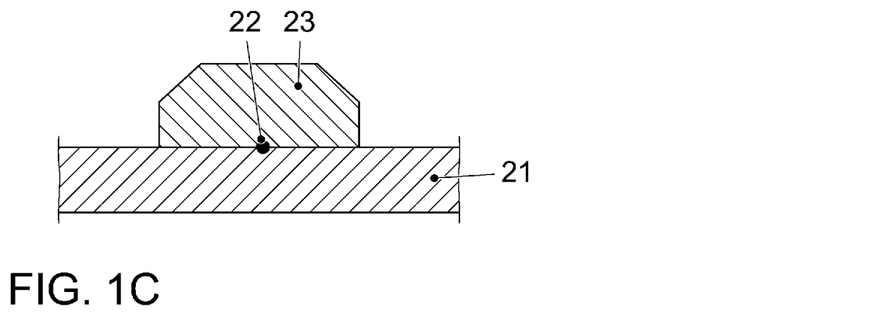

In the subsequent step, according to FIG. 1C a deposition of an electrically conductive volume material from the gas phase takes place directly on the carbon-based carrier material, forming discrete core layers 23, for example in the form of spherical halves. The anchors 22 serve, on the one hand, as the nucleus or starting point for the deposition and layer-building process, and on the other hand ensure the formation of a stable, in particular, chemical, bonding of the volume material to the carrier material, that is to say the fixing and immobilization on the latter. In this way, it can also be achieved, in particular, that the resulting structures are spatially separated from one another on the carbon carrier 21 and do not grow together by sintering processes. In particular, metal nitrides, metal carbides, metal borides, metal oxides and combinations thereof and mixtures thereof are used as the volume material for this core layer 23. Preferably, a metal nitride, for example titanium nitride, or a metal carbide as a volume material for the core layer 23 is produced. The deposition of these "anchoring materials" on the preconditioned carbon surface takes place by means of a chemical or physical gas deposition process, such as CVD, ALD, PVD, PLD, etc. In the case of a chemical gas deposition process, a suitable reactive precursor of the volume material is used or in the case of a chemical vapor deposition process physical gas deposition method is a target which consists directly of the volume material to be deposited. These starting materials are transferred into the gas phase by a suitable technique and transported into a vacuum chamber in which the carrier material 21 is arranged as a substrate. The deposition of the material on the carrier material 21 then begins on the anchors 22. The corresponding metal of the volume material, for example titanium, is, for example, vaporized in the form of a reactive precursor in the form of a metal-organic compound and transported into the vacuum chamber. At the same time, either a source of nitrogen, a carbon source, a source of boron, or an oxygen source for producing the corresponding nitride, carbide, boride or oxide or a combination of these mixed compound sources is transferred into the gas phase and also transported into the vacuum chamber. This is followed by deposition on the mostly heated carrier material and reaction of this precursor compound, with the corresponding volume material. The layer thickness is controlled by the concentration of the reactants or the gas volume flow, as well as the process duration and is preferably 5 to 20 nm. Optionally the crystallization of the volume material can be supported in a subsequent annealing step.

Figure 1D:
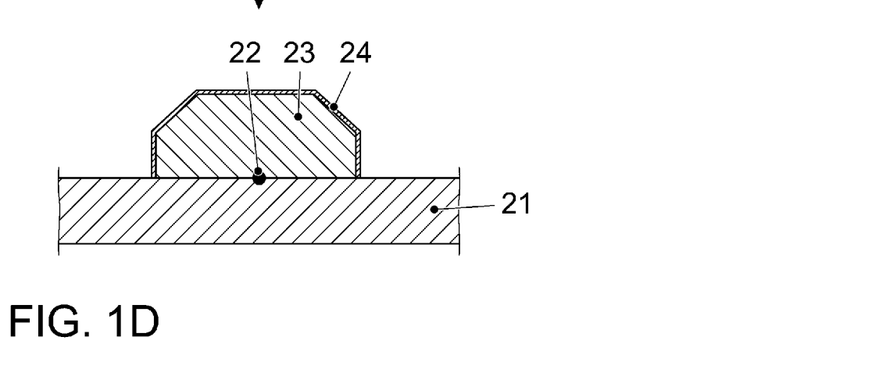

In an optional subsequent process step according to FIG. 1D a bonding agent layer 24, for example tungsten W, is applied, for which a chemical or physical gas separation process is also used. The adhesion-imparting layer 24 preferably has an average layer thickness of 1 to 2 atomic layers.

Figure 1E:
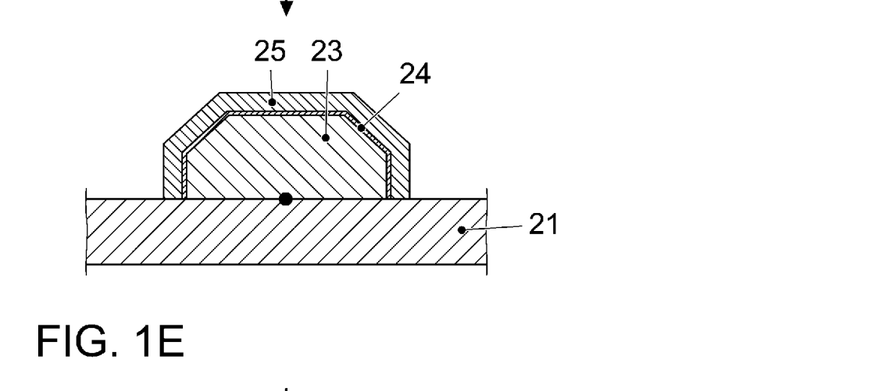

Subsequently, according FIG. 1E the application of an intermediate layer 25, takes place, for which a chemical or physical gas deposition process is also applied. The intermediate layer 25 is an alloy of a catalytically active noble metal, for example, an alloy of platinum and/or palladium, with at least one alloying element which is selected in such a way that the alloy formed has the highest possible thermodynamic stability. Examples of suitable alloying elements are nickel and/or cobalt. A chemical gas deposition process, such as CVD or ALD, is preferably used in which suitable reactive precursor compounds of the corresponding metals are used. These reactive precursors are, in particular, organometallic compounds of the respective elements. Suitable organometallic compounds are, for example, alkyls, alkenyls or alkoxides. In the case of platinum, for example, trimethyl (methylcyclopentadienyl) platinum is used. In order to deposit the metal or the metals metallically, that is to say with the oxidation stage zero, a suitable reducing agent with a sufficient reduction potential, for example hydrogen or a hydrogen-nitrogen mixture, is added to the gas atmosphere in the vacuum chamber or the carrier gas. As a result, the intermediate layer 25 is produced from the corresponding noble metal alloy with a preferred average layer thickness of 4 to 6 atomic layers.

Figure 1F:
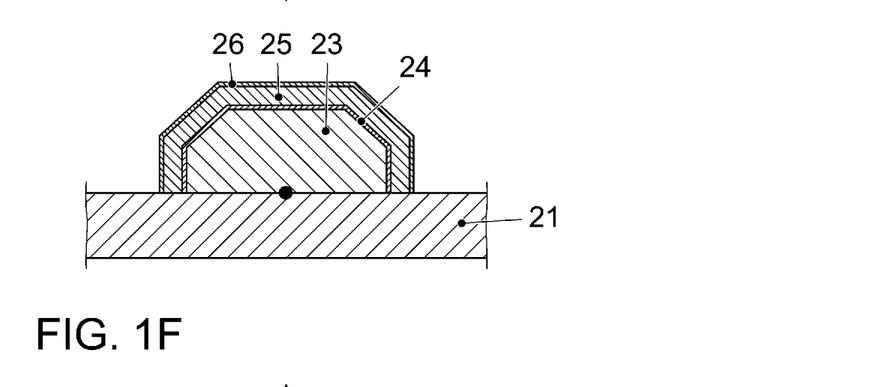

In the subsequent step according to FIG. 1F the surface layer 26 is deposited from the catalytically active noble metal, in particular platinum, palladium or an alloy of both. This deposition also takes place from the gas phase by means of a physical, but preferably a chemical, gas phase deposition process. The procedure corresponds to the deposition of the intermediate layer 25 as described above. The layer thickness of the surface layer 26 is preferably only 1 to 2 atomic layers.

Instead of a separate deposition of the surface layer 26 by means of gas-phase deposition, the surface layer 26 can be effected by chemical or (electro) chemical de-alloying of the intermediate layer 25. In this case, the less noble alloying constituents are chemically or electrochemically removed from the intermediate layer 25 so that only a shell of the noble metal (platinum and/or palladium) remains on the surface. However, since the result of such a segregation process frequently does not provide a continuous but a discontinuous noble metal layer, a separate gas deposition process for producing the catalytic noble metal surface layer 26 is preferred.

After each individual deposition step, an annealing step can optionally be carried out in order to promote the crystallization of the deposited layer.

Figure 1G:
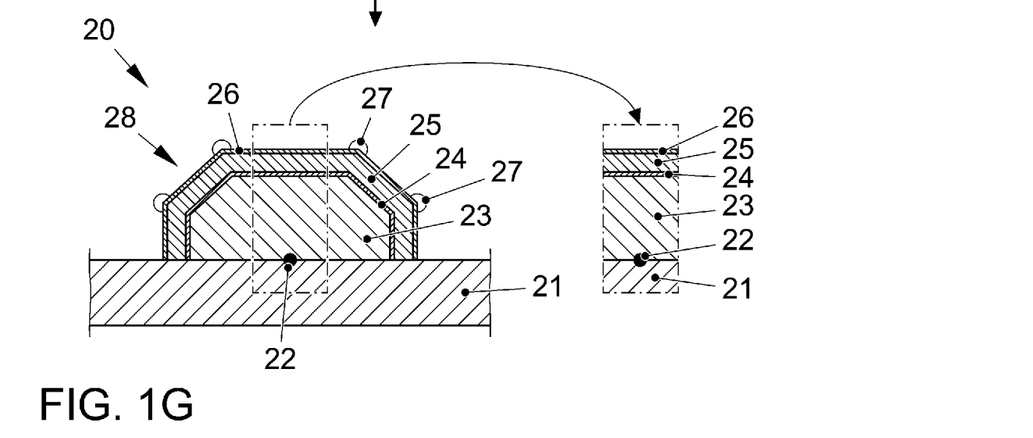

In another optional process step, the production of local protective layers 27 on corners and/or edges of the crystalline or semi-crystalline surface layer 26 of the catalytic noble metal takes place according to FIG. 1G. Here too, gas separation processes, in particular chemical gas deposition methods, such as CVD or ALD, are used. As a material for the protective layer 27 a material with high corrosion stability is used comprising oxides (for example $Al_2O_3$, $B_2O_3$, $SiO_2$), carbides (for example $B_4C$, SiC, WC), nitrides (for example BN, AlN, $Si_3N_4$, TiN) or gold (Au). Since the crystal corners and edges act as crystallization nuclei, the targeted deposition of these protective materials at these sites is readily possible.

FIG. 1G shows the finished catalyst material 20 according to the disclosure, the detail on the right showing the structure in detail. All deposited layers 23, 24, 25, 26 and 27 are thus produced by means of a gas deposition process. Supported by the anchor point 22 the catalytic structures 28 are constructed such that these are produced separately from one another on the carbon carrier material 21. Depending on the nature of the anchor point 22 a covalent bonding of the volume material of the core layer 23 to the carbon material of the carrier 21, occurs, but at least to a materially bonded connection. The catalytic structures 28 produced in this way have the form of semi-particles with a core-shell structure, whereby the material of the core layer 23 has a direct, material-locking contact with the carbon material of the carrier 21. The catalyst material 20 thus obtained shows very high chemical and mechanical stability with a comparatively low requirement for the catalytic noble metal of the surface layer 26.

Figure 2A:
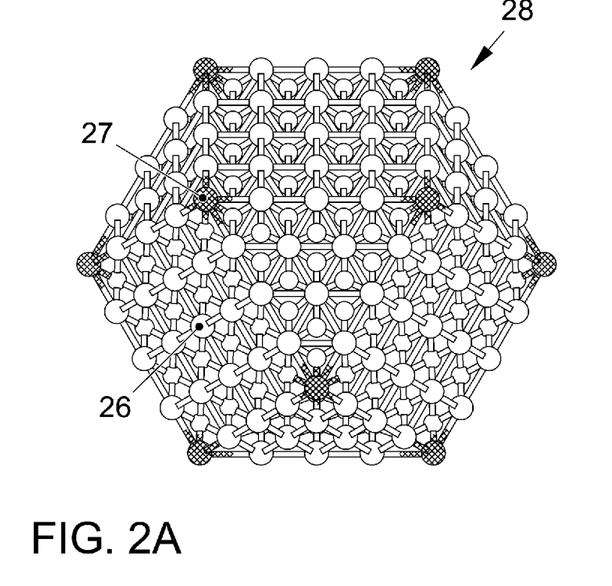
FIGS. 2A and 2B is a schematic plan view of catalytic structures of a supported catalyst material according to embodiments of the present disclosure with a protective layer (A) on crystal corners and (B) on crystal edges of the surface layer.
Figure 2B:
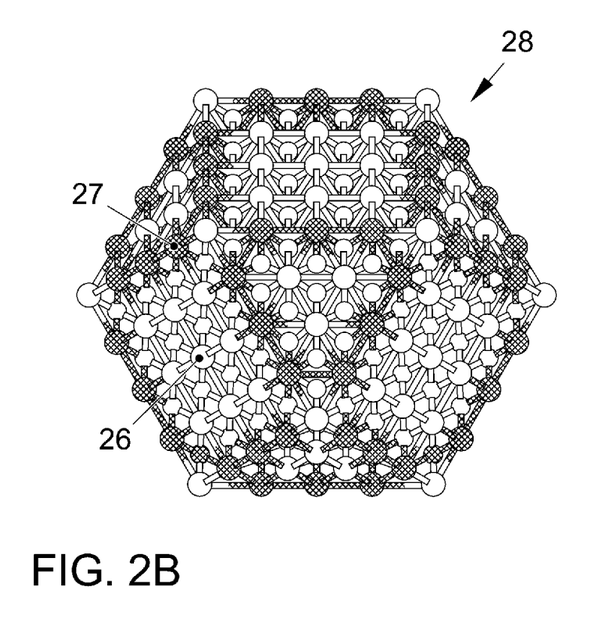

FIG. 2 shows a schematic plan view of catalytic structural elements 28 according to the disclosure, which are provided with local protective layers 27. According to FIG. 2A only the crystal corners are provided with such "edge protection", whereas according to FIG. 2B the crystal edges have the protective layer 27.

In order to manufacture an electrode for a fuel cell, a composition (slurry, paste or the like) is first produced from the catalytic material 20 according to the disclosure, which contains a solvent, in addition to the catalytic material 20 and may contain further additives, in particular, a polymeric binder. This composition is then applied to a flat support as a coating, for which any coating process, for example coating, spraying, scraping, printing or the like can be used. The flat carrier is, in particular, a polymer electrolyte membrane of the fuel cell, which is preferably coated on both sides with the catalytic material. Alternatively, the catalytic coating can also be applied to a gas diffusion layer or to another gas-permeable electrically conductive substrate, such as carbon paper.

Figure 3:
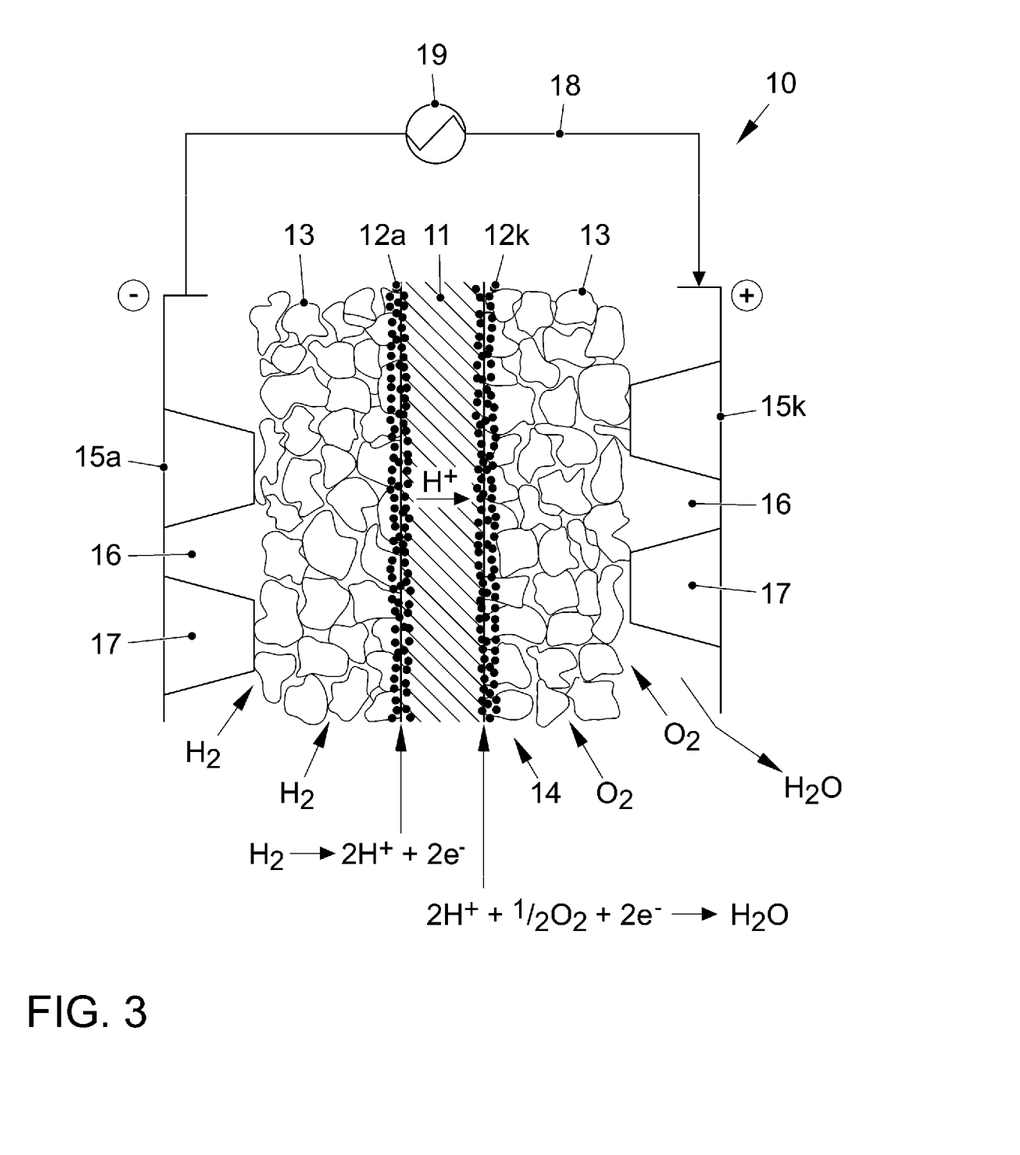
FIG. 3 is a sectional view of a fuel cell with a catalyst material according to the disclosure.

FIG. 3 shows the structure of such a fuel cell 10 in a schematic sectional view. The core piece of the fuel cell 10 is a membrane electrode arrangement (MEA), designated overall by reference numeral 14. The MEA 14 comprises a polymer electrolyte membrane 11, two catalytic electrodes or catalytic coatings arranged on the flat sides thereof, namely an anode 12a and a cathode 12k, as well as two gas diffusion layers 13 arranged on both sides thereof. The polymer electrolyte membrane 11 is an ion-conducting, in particular proton-conducting polymer, for example a product marketed under the trade name Nafion®. The catalytic electrodes 12a, 12k comprise the catalytic material according to the disclosure and are designed as a double-sided coating of the membrane 11 in the illustrated example. The gas diffusion layers 13 consist of a gas-permeable electrically conductive material which, for example, has the structure of a foam or a fiber structure or the like and serves to distribute the reaction gases to the electrodes 12a and 12k. Bipolar plates 15 namely an anode plate 15a and a cathode plate 15k are connected to the membrane electrode arrangement 14 on both sides. Usually, a plurality of such individual cells 10 are stacked into a fuel cell stack so that each bipolar plate is composed of an anode plate 15a and a cathode plate 15k. The bipolar plates 15a, 15k each comprise a structure of reactant channels 16, which are open in the direction of the gas diffusion layers 13 and serve to supply and distribute the reactants of the fuel cell. Thus, via the reactant channels 16 of the anode plate 15, the fuel, here hydrogen $H_2$, is supplied via the corresponding channels 16 of the cathode plate 15k oxygen $O_2$ or an oxygen-containing gas mixture, in particular air. The bipolar plates 15a, 15k are connected to one another via an external circuit 18 and to an electrical load 19, for example a traction motor for an electric vehicle or a battery.

During operation of the fuel cell 10 the hydrogen is supplied via the reactant channels 16 of the anode plate 15a distributed over the gas diffusion layer 13 on the anode side and fed to the catalytic anode 12a. Here, a catalytic dissociation and oxidation of hydrogen $H_2$ to protons $H^+$ takes place, with release of electrons, which are removed via the circuit 18. On the other hand, via the cathode plate 15k the oxygen is conducted to the catalytic cathode 12k via the cathode-side gas diffusion layer 13. At the same time, the proteins $H^+$ formed on the anode side diffuse across the polymer electrolyte membrane 11 in the direction of the cathode 12k. In this case, the oxygen supplied to the catalytic noble metal reacts with the protons to the water, which is discharged from the fuel cell 10 with the reaction gas, via the electrons supplied via the external circuit 18. The electrical load 19 can be supplied by the electrical current flow thus generated.

The catalyst material 20 according to the present disclosure may be used for the anode 12a and/or the cathode 12k of fuel cells. The fuel cell 10 equipped with the catalytic material 20, according to the disclosure, is characterized as the catalytic electrodes 12a, 12k have a low corrosion tendency and thus high long-term stability. At the same time, comparatively little catalytic noble metal is required since the main volume of the catalytic material of the electrodes is formed by a comparatively inexpensive material.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A supported catalyst material for a fuel cell, comprising:
   a porous, electrically conductive carbon-based carrier material; and
   catalytic structures including a first catalytic structure and a second catalytic structure on the carbon-based carrier material, the first catalytic structure and the second catalytic structure each including:
   a center region including: an anchor covalently bonded to a portion of the carbon-based carrier material, and a core layer of an electrically conductive bulk material on and around the anchor, the core layer in direct contact with the carbon-based carrier material, the center region of the first catalytic structure spatially separated from the center region of the second catalytic structure, and
   a surface layer of a catalytically active noble metal or an alloy thereof on the core layer, the surface layer comprising crystal edges and crystal corners, wherein a local protective layer selectively covers the crystal edges or the crystal edges and the crystal corners.

2. The catalyst material according to claim 1 wherein the bulk material of the core layer of the first catalytic structure and the second catalytic structure is selected from the group consisting of nitrides, carbides, borides, oxides of metals, and combinations thereof.

3. The catalyst material according to claim 1, wherein the first catalytic structure and the second catalytic structure each include a bonding agent layer comprising tungsten, arranged between the core layer and the surface layer.

4. The catalyst material according to claim 1, wherein an intermediate layer comprising a noble metal alloy is arranged between the core layer and the surface layer of each of the first catalytic structure and the second catalytic structure.

5. The catalyst material according to claim 1, wherein an intermediate layer comprising a noble metal alloy is arranged between an adhesion-promoting layer and the surface layer of each of the first catalytic structure and the second catalytic structure.

6. The catalyst material according to claim 1, wherein the carbon-based carrier material of each of the first catalytic structure and the second catalytic structure has a porous particulate structure.

7. The catalyst material according to claim 6, wherein the carbon-based carrier material of each of the first catalytic structure and the second catalytic structure includes graphite, volcanic graphite carbon, graphene, ketjenblack, acetylene black, furnace black, carbon black, activated carbon and meso phase carbon.

8. An electrode structure for a fuel cell, comprising:
   a flat carrier, selected from a polymer electrolyte membrane and a gas-permeable electrically conductive substrate; and
   a catalytic converter arranged on at least one side of the flat carrier; and
   a coating that includes:
   a supported catalyst material that includes:
      a porous, electrically conductive carbon-based carrier material; and
      catalytic structures including a first catalytic structure and a second catalytic structure on the carbon-based carrier material, the first catalytic structure and the second catalytic structure each having a multilayer structure that includes:
         a center region including an anchor covalently bonded to a portion of the carbon-based carrier material, and a core layer of an electrically conductive bulk material on and around the anchor, the core layer in direct contact with the carbon-based carrier material, the center region of the first catalytic structure being spatially separated from center region of the second catalytic structure, and a surface layer of a catalytically active noble metal or an alloy thereof on the core layer, the surface layer comprising crystal edges and crystal corners, wherein a local protective layer selectively covers the crystal edges or the crystal edges and the crystal corners.

9. The electrode structure of claim 8, wherein a bonding agent layer comprising tungsten, is arranged between the core layer and the surface layer of each of the first catalytic structure and the second catalytic structure.

10. The catalyst material of claim 6, wherein the porous particulate structure includes spheroids or fibers.

11. The catalyst material of claim 1, wherein the protective layer of each of the first catalytic structure and the second catalytic structure comprises at least one oxide, carbide, nitride, or gold.

12. The catalyst material of claim 11, wherein the protective layer of each of the first catalytic structure and the second catalytic structure comprises alumina, boron oxide, silicon oxide, boron carbide, silicon carbide, tungsten carbide, boron nitride, aluminum nitride, silicon nitride, titanium nitride, or gold.

13. The catalyst material of claim 6, wherein the porous particulate structure of each of the first catalytic structure and the second catalytic structure includes nanostructures selected from the group consisting of carbon nanotubes, carbon nanorods, carbon nanofibers, and carbon nanobands.

14. The catalyst material of claim 1, wherein the catalytically active noble metal or alloy comprises ruthenium, rhodium, palladium, osmium, iridium, platinum, or combinations thereof.

15. The catalyst material of claim 14, wherein the catalytically active noble metal or alloy comprises platinum.

16. The catalyst material of claim 1, wherein the local protective layer covers only the crystal edges.

17. The catalyst material of claim 1, wherein the local protective layer covers only the crystal edges and the crystal corners.

18. The electrode structure of claim 8, wherein the local protective layer covers only the crystal edges.

19. The electrode structure of claim 8, wherein the local protective layer covers only the crystal edges and the crystal corners.

* * * * *